US008645725B2

(12) United States Patent
Mikami

(10) Patent No.: US 8,645,725 B2
(45) Date of Patent: Feb. 4, 2014

(54) POWER UP A LAN MODULE WHEN EXECUTION OF SPECIAL REPRODUCTION IS EXPECTED BY USER DURING REPRODUCTION OF AN OPTICAL DISC REPRODUCTION APPARATUS

(75) Inventor: Tetsuo Mikami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/188,733

(22) Filed: Jul. 22, 2011

(65) Prior Publication Data
US 2012/0026853 A1   Feb. 2, 2012

(30) Foreign Application Priority Data
Jul. 29, 2010   (JP) ................. 2010-170104

(51) Int. Cl.
G06F 1/00 (2006.01)
G06F 1/32 (2006.01)

(52) U.S. Cl.
USPC .......................................... 713/300; 713/320

(58) Field of Classification Search
USPC .......................................... 713/300, 324, 340
See application file for complete search history.

(56) References Cited

U.S. PATENT DOCUMENTS

| 6,480,448 | B1* | 11/2002 | Kawano et al. ............... 369/47.5 |
| 7,126,252 | B2* | 10/2006 | Kita ............................... 310/317 |
| 7,327,651 | B2* | 2/2008 | Nakao et al. ............... 369/47.53 |
| 7,693,401 | B2* | 4/2010 | Gohda ........................... 386/224 |
| 8,347,128 | B2* | 1/2013 | Suzuki et al. ................. 713/310 |
| 2005/0138453 | A1* | 6/2005 | Terai ............................. 713/320 |
| 2005/0213451 | A1* | 9/2005 | Nakao et al. ............... 369/47.53 |
| 2007/0136240 | A1 | 6/2007 | Wang et al. |
| 2009/0006872 | A1 | 1/2009 | Araki |
| 2010/0183283 | A1 | 7/2010 | Yasunaga |
| 2010/0262856 | A1 | 10/2010 | Lee et al. |
| 2011/0039508 | A1* | 2/2011 | Lindahl et al. ................. 455/230 |

FOREIGN PATENT DOCUMENTS

| EP | 1 785 812 A2 | 5/2007 |
| EP | 2 209 122 | 7/2010 |
| JP | 2002-142141 | 5/2002 |
| JP | 2003-263873 | 9/2003 |
| JP | 2009-015900 | 1/2009 |
| WO | 2005/045842 | 5/2005 |

OTHER PUBLICATIONS http://en.wikipedia.org/wiki/Optical_disc "Optical Disc" 6 pages, Dated Oct. 16, 2009.*
Extended European Search Report dated Dec. 1, 2011 for corresponding EP Application 11175480.0.

* cited by examiner

Primary Examiner — Thomas Lee
Assistant Examiner — Phil Nguyen
(74) Attorney, Agent, or Firm — Morgan, Lewis & Bockius LLP

(57) ABSTRACT

An optical disc reproducing apparatus includes an Internet connectable LAN module and a control unit for controlling the LAN module. In the optical disc reproducing apparatus, the operation of the LAN module is temporarily stopped for periods during which an optical disc is being reproduced and Internet connection is not necessary.

4 Claims, 4 Drawing Sheets

POWER UP A LAN MODULE WHEN EXECUTION OF SPECIAL REPRODUCTION IS EXPECTED BY USER DURING REPRODUCTION OF AN OPTICAL DISC REPRODUCTION APPARATUS

This nonprovisional application claims priority under 35 U.S.C. §119(a) on Patent Application No. 2010-170104 filed in Japan on Jul. 29, 2010, the entire contents of which are hereby incorporated by reference.

BACKGROUND OF THE INVENTION

1. Field of the Invention

The present invention relates to an optical disc reproducing apparatus and particularly to an optical disc reproducing apparatus connectable to the Internet.

2. Description of the Related Art

A standard called a profile is specified for a Blu-ray Disc (registered trademark; hereinafter, referred to as "BD"). A new function called "BD-Live" is defined in the latest standard "BD-ROM Profile 2.0" of BD-ROMs.

"BD-Live" is a function of downloading auxiliary data corresponding to contents of a BD being reproduced via the Internet utilizing a LAN (Local Area Network) module, recording them in an auxiliary storage device (storage device having a capacity of 1 Gbyte and above) and reproducing the contents of the BD utilizing the downloaded auxiliary data.

Auxiliary data to be downloaded include, for example, movie preview footage, bonus footage, subtitle and dubbing in additional languages, a password to watch the bonus footage, and the like.

On the other hand, some of optical disc reproducing apparatuses of recent years include a contents streaming reproduction function via the Internet utilizing a LAN module in addition to a function of reproducing optical discs. Conventionally, in such an optical disc reproducing apparatus, a LAN module has constantly operated during the operation of the optical disc reproducing apparatus.

Also in a conventional optical disc reproducing apparatus compatible with "BD-Live", a LAN module has similarly constantly operated during the operation of the optical disc reproducing apparatus. However, cases which require Internet connection during the reproduction of a BD are limited and there has been a problem that the constant operation of the LAN module causes the waste of CPU (Central Processing Unit) resources and power consumption of the optical disc reproducing apparatus.

Note that, without being limited to "BD-Live" compatible optical disc reproducing apparatuses, similar problems occur in optical disc recording apparatuses in general which require Internet connection during the reproduction of an optical disc only in limited cases.

Japanese Unexamined Patent Publications Nos. 2003-263873, 2009-15900 and 2002-142141 disclose a power consumption reduction technology. Any of Japanese Unexamined Patent Publications Nos. 2003-263873, 2009-15900 and 2002-142141 neither discloses nor indicates a power consumption reduction technology in optical disc reproducing apparatuses which require Internet connection during the reproduction of an optical disc only in limited cases.

SUMMARY OF THE INVENTION

An object of the present invention is to provide an Internet connectable optical disc reproducing apparatus capable of suppressing power consumption and a utilization rate of a control unit.

To accomplish the above object, the present invention is directed to an optical disc reproducing apparatus, including an Internet connectable LAN module; and a control unit for controlling the LAN module, wherein the operation of the LAN module is temporarily stopped for periods during which an optical disc is being reproduced and Internet connection is not necessary.

According to such a construction, power consumption and a utilization rate of the control unit can be suppressed since the operation of the LAN module is temporarily stopped for the periods during which the optical disc is being reproduced and Internet connection is not necessary.

The optical disc reproducing apparatus may have a special reproduction function of accessing a specified website on the Internet utilizing the LAN module, downloading auxiliary data corresponding to contents of a Blu-ray Disc (registered trademark) being reproduced via the Internet, recording the auxiliary data in a storage device other than the Blu-ray Disc and reproducing the contents of the Blu-ray Disc while utilizing the downloaded auxiliary data; and the operation of the LAN module may be temporarily stopped for periods during which the Blu-ray Disc is being reproduced and Internet connection is not necessary.

Further, at least one of the periods during which the Blu-ray Disc is being reproduced and Internet connection is not necessary may be a period from the start of playback of a main movie recorded on the Blu-ray Disc to the stop of playback of the main movie or to the start of display of a pop-up menu; and the pop-up menu may include a selection item of the special reproduction function.

Further, at least one of the periods during which the Blu-ray Disc is being reproduced and Internet connection is not necessary may be a period from the end of display of the pop-up menu to the stop of playback of the main movie or the restart of display of the pop-up menu.

DETAILED DESCRIPTION OF PREFERRED EMBODIMENTS

An embodiment of the present invention is described below with reference to the drawings. One schematic construction example of an optical disc reproducing apparatus according to the present invention is shown in FIG. 1.

Figure 1:
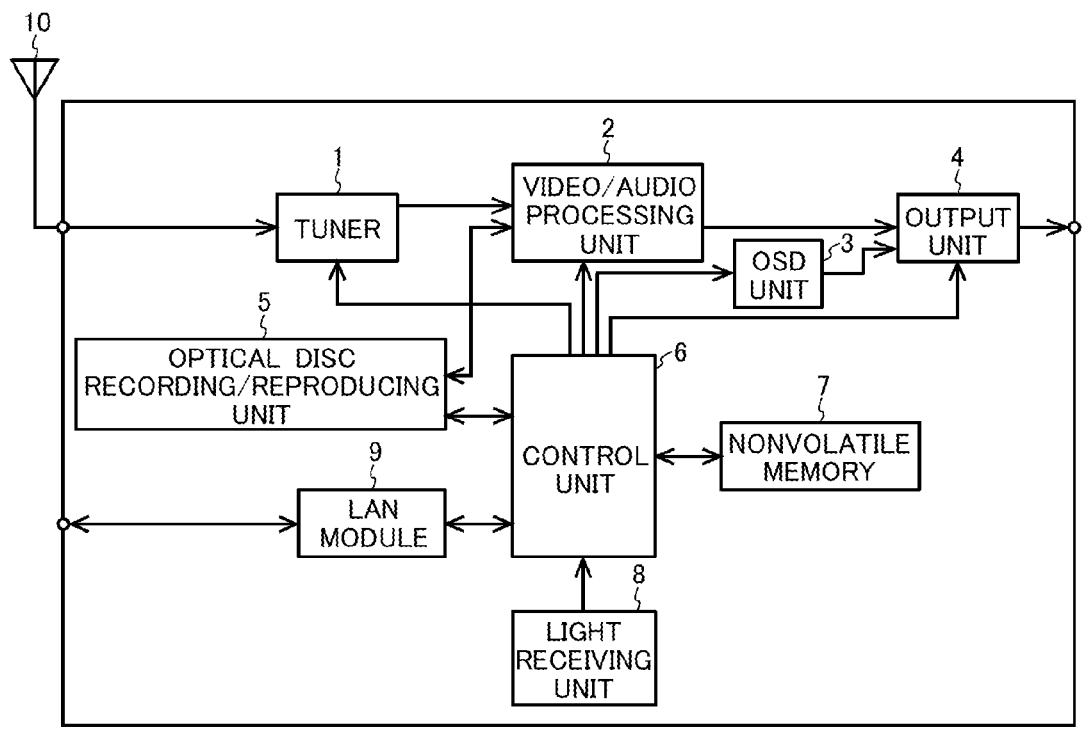
FIG. 1 is a diagram showing one schematic construction example of an optical disc reproducing apparatus according to the present invention.

The optical disc reproducing apparatus shown in FIG. 1 is a BD recorder having a recording function in addition to a reproduction function and includes a tuner 1, a video/audio processing unit 2, an OSD (On-Screen Display) unit 3, an output unit 4, an optical disc recording/reproducing unit 5, a control unit 6, a nonvolatile memory 7 and a light receiving unit 8. Note that a CPU may be, for example, used as the control unit 6.

The tuner 1 channel-tunes and demodulates (e.g. OFDM (Orthogonal Frequency Division Multiplexing) demodulation) a television broadcast signal received from an antenna 10. The video/audio processing unit 2 sends a video/audio signal received from the tuner 1 or a video/audio signal reproduced in the optical disc recording/reproducing unit 5 to the output unit 4 or sends a video/audio signal received from the tuner 1 to the optical disc recording/reproducing unit 5. The OSD unit 3 sends OSD image data generated in accordance with an instruction from the control unit 6 to the output unit 4. The output unit 4 externally outputs a synthesized video signal obtained by synthesizing a video signal received from the video/audio processing unit 2 and OSD image data received from the OSD unit 3, externally outputs a video signal received from the video/audio processing unit 2 as it is without performing the above synthesis process, externally outputs OSD image data received from the OSD unit 3 as it is without performing the above synthesis process or externally outputs an audio signal received from the video/audio processing unit 2. An output signal of the output unit 4 is transmitted to a television receiver (not shown) connected to the optical disc reproducing apparatus shown in FIG. 1. The television receiver connected to the optical disc recording apparatus shown in FIG. 1 displays a video image or outputs a sound based on the output signal of the output unit 4.

The optical disc recording/reproducing unit 5 records a video/audio signal received from the video/audio processing unit 2 on the optical disc and reproduces a video/audio signal recorded on the optical disc. Note that the optical disc is unloadably loaded into the optical disc recording/reproducing unit 5. Further, the optical disc recording/reproducing unit 5 is compatible with BDs, DVDs and CDs, discriminates the type of an optical disc when the optical disc is loaded and performs reproduction or recording corresponding to a discrimination result.

The light receiving unit 8 receives a remote controller infrared signal transmitted from a remote controller transmitter (not shown), converts it into an electrical signal and further extracts an operation code from the electrical signal and sends it to the control unit 6. The control unit 6 controls the respective parts of the optical disc reproducing apparatus shown in FIG. 1 based on a control program and various settings stored in the nonvolatile memory 7 (e.g. data table indicating a correspondence relationship between respective operation codes and respective functions, an the like), an operation code received from the light receiving unit 8 and an operation code determined by signals output from a group of operation keys (not shown) provided on a main body of the optical disc reproducing apparatus shown in FIG. 1.

A LAN module 9 can be easily connected to the Internet via a network-connected modem (not shown). In the execution of "BD-Live", the control unit 6 performs a reproduction control for accessing a website corresponding to a specified "BD-Live" on the Internet utilizing the LAN module 9, downloading auxiliary data corresponding to contents of a BD being reproduced via the Internet, recording them in the nonvolatile memory 7, and reproducing the contents of the BD utilizing the downloaded auxiliary data.

The operation of the optical disc reproducing apparatus shown in FIG. 1 and constructed as described above is described with reference to a flow chart shown in FIG. 2.

Figure 2:
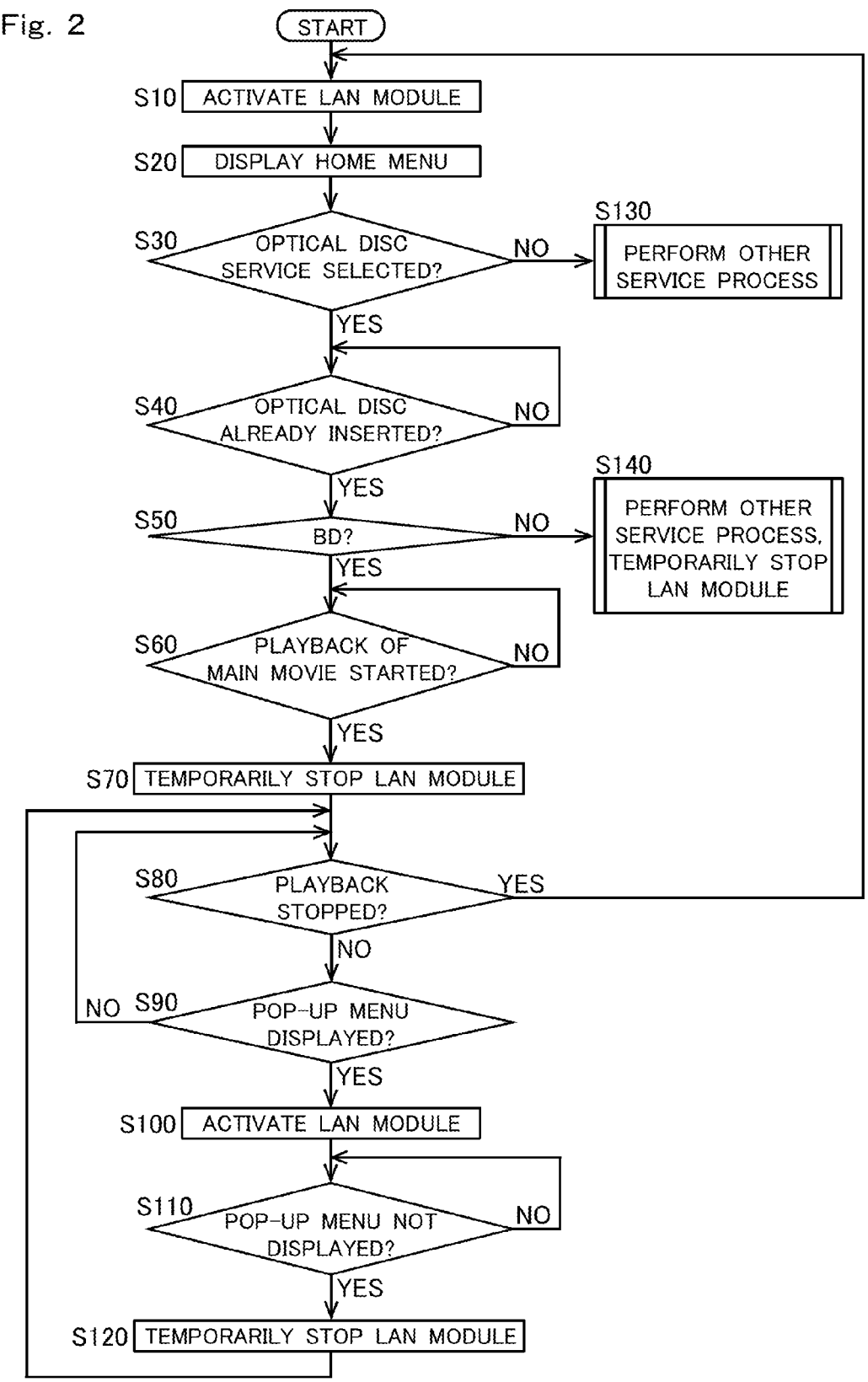
FIG. 2 is a flow chart showing the operation of the optical disc reproducing apparatus shown in FIG. 1.

When the optical disc reproducing apparatus shown in FIG. 1 is turned on, a flow chart operation of FIG. 2 starts.

First, in Step S10, the LAN module 9 is activated. Then, in Step S20 following Step S10, OSD image data used to display a home menu displaying various services provided by the optical disc reproducing apparatus shown in FIG. 1 is output from the output unit 4 and the home menu is displayed on a display screen of the television receiver connected to the optical disc reproducing apparatus shown in FIG. 1.

In Step S30 following Step S20, the control unit 6 determines whether or not a user has performed an operation of selecting an optical disc service on the home menu using a group of operation keys provided on the remote controller transmitter or on the main body of the optical disc reproducing apparatus shown in FIG. 1.

If a service other than the optical disc service is selected (NO in Step S30), the optical disc reproducing apparatus shown in FIG. 1 performs a process of the selected service (Step S130). If the selected service is a contents streaming reproduction service or an Internet radio service via the Internet, the operating state of the LAN module 9 is maintained since Internet connection is necessary. However, if the selected service is a service which does not require Internet connection, the operation of the LAN module 9 may be temporarily stopped.

On the other hand, if the optical disc service is selected (YES in Step S30), the control unit 6 obtains information from the optical disc recording/reproducing unit 5 and determines whether or not any optical disc is inserted in the optical disc recording/reproducing unit 5 (Step S40). If the optical disc is inserted (YES in Step S40), a transition is made to Step S50.

In Step S50, the control unit 6 obtains information from the optical disc recording/reproducing unit 5 and determines whether or not the optical disc inserted in the optical disc recording/reproducing unit 5 is a BD.

If the optical disc inserted in the optical disc recording/reproducing unit 5 is not a BD, but a DVD or a CD (NO in Step S50), the control unit 6 controls the optical disc recording/reproducing unit 5 so as to perform reproduction or recording corresponding to the DVD or CD (Step S140). Since there is no possibility of requiring Internet connection at the time of CD and DVD reproduction, the operation of the LAN module 9 is temporarily stopped in Step S140.

On the other hand, if the optical disc inserted in the optical disc recording/reproducing unit 5 is a BD (YES in Step S50), a transition is made to Step S60.

In Step S60, the control unit 6 obtains information from the optical disc recording/reproducing unit 5 and determines whether or not the playback of a main movie recorded on the BD has been started. Some BDs automatically start playing a main movie and some BDs start playing a main movie only after "PLAY MOVIE" in a top menu is selected.

A transition is immediately made to Step S70 if the BD is the one that automatically starts playing a main movie.

Figure 3:
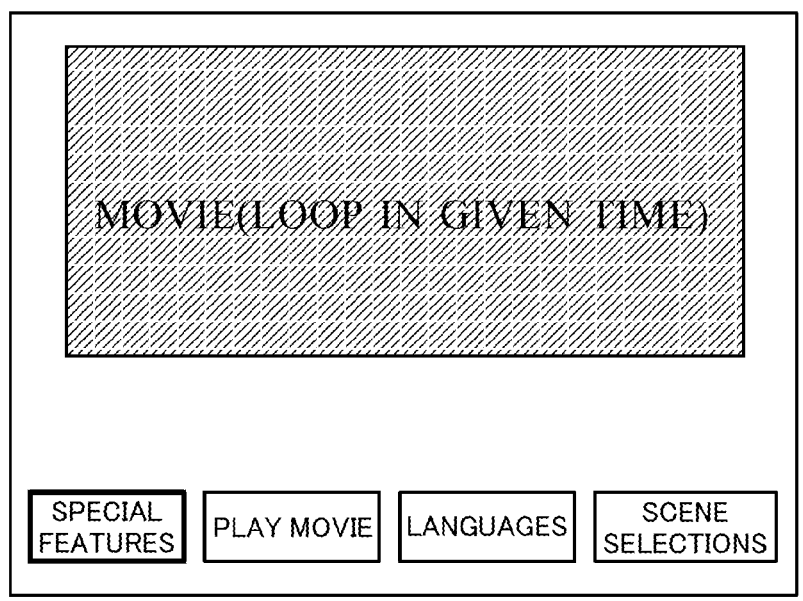
FIG. 3 is a diagram showing a display example of a top menu.
Figure 4:
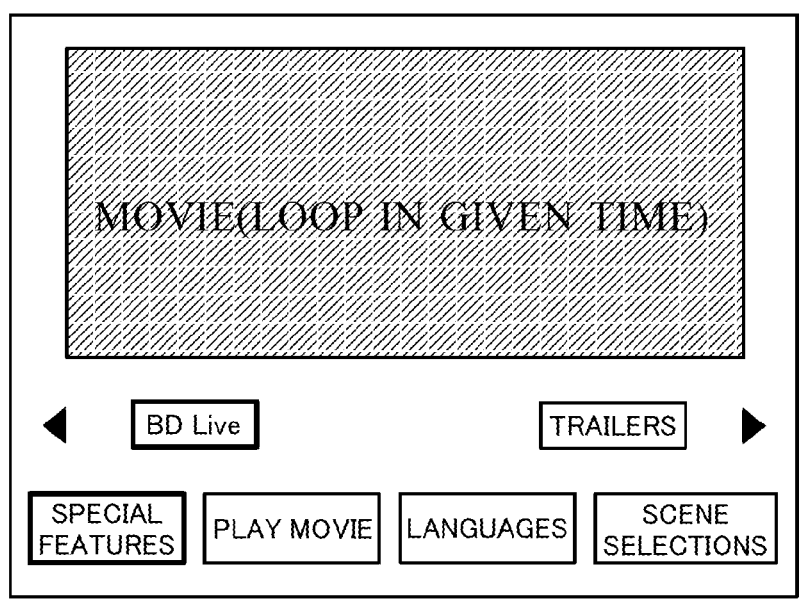
FIG. 4 is a diagram showing a display example of the top menu.

On the contrary, if the BD is the one that starts playing a main movie only after "PLAY MOVIE" in the top menu is selected, OSD image data used to display a top menu is output from the output unit 4 and a top menu shown in FIG. 3 is displayed on the display screen of the television receiver connected to the optical disc reproducing apparatus shown in FIG. 1 at the start of Step S60. A focus frame indicated by a thick frame in FIG. 3 can be moved by the user operating the group of operation keys provided on the remote controller transmitter or on the main body of the optical disc reproducing apparatus shown in FIG. 1. This focus frame means a candidate for selection and an item of the focus frame can be selected by a user operation to confirm the selection. If "SPECIAL FEATURES" is selected in a display state shown in FIG. 3, a display state shown in FIG. 4 is set and "BD Live" can be selected. In the case of a BD of this type, a transition is made to Step S70 if "PLAY MOVIE" in the top menu is selected.

Once the playback of the main movie is started, the operation of the LAN module 9 is temporarily stopped in Step S70 since there is no possibility of selecting "BD-Live" unless a pop-up menu is displayed.

In Step S80 following S70, the control unit 6 determines whether or not the playback of the main movie has been stopped. If the playback of the main movie has been stopped (YES in Step S80), a transition is made to Step S10. On the other hand, unless the playback of the main movie has been stopped (NO in Step S80), a transition is made to Step S90.

In Step S90, the control unit 6 determines whether or not a pop-up menu is displayed.

Figure 5:
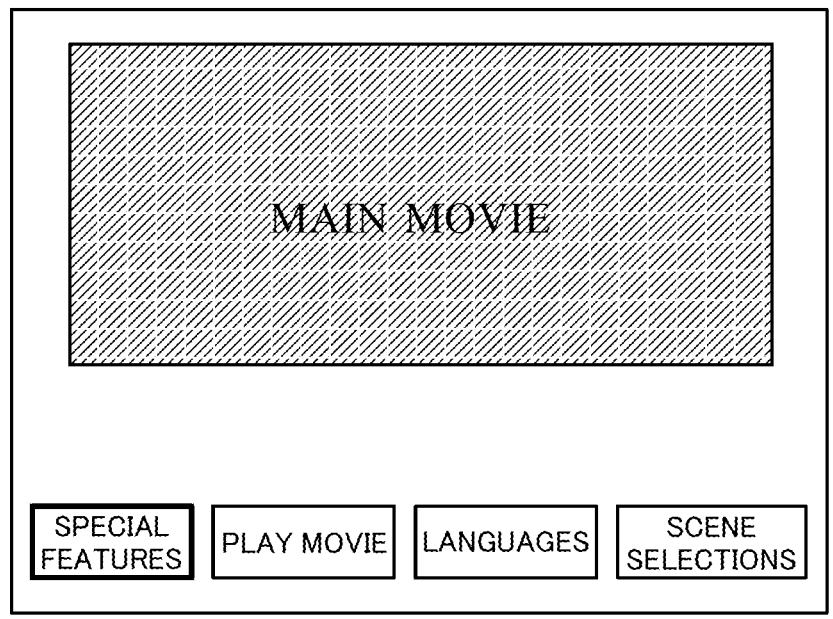
FIG. 5 is a diagram showing a display example of a pop-up menu.
Figure 6:
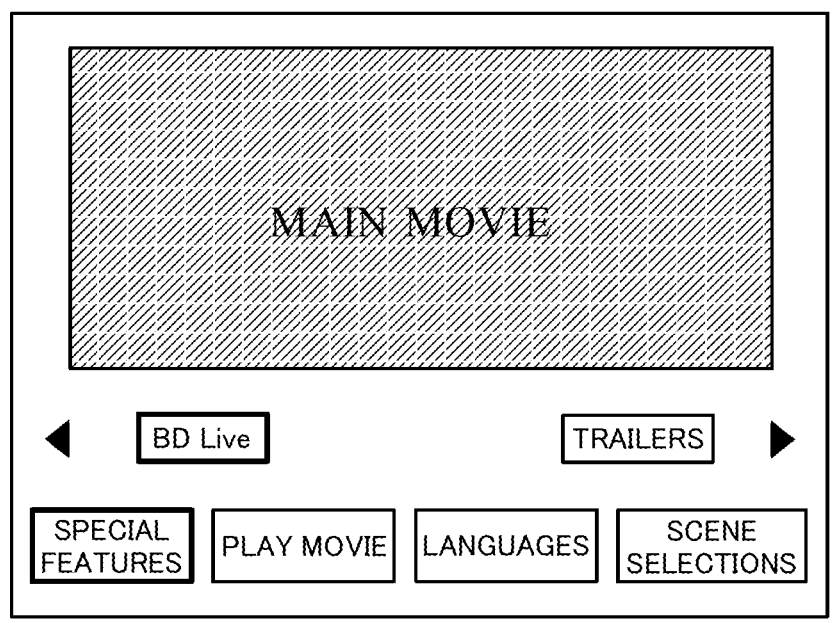
FIG. 6 is a diagram showing a display example of the pop-up menu.

If the user depresses a menu key of the remote controller transmitter during the playback of the main movie, OSD image data used to display a pop-up menu is output from the output unit 4 and a pop-up menu shown in FIG. 5 is displayed on the display screen of the television receiver connected to the optical disc reproducing apparatus shown in FIG. 1. A focus frame indicated by a thick frame in FIG. 5 can be moved by the user operating the group of operation keys provided on the remote controller transmitter or on the main body of the optical disc reproducing apparatus shown in FIG. 1. This focus frame means a candidate for selection and an item of the focus frame can be selected by a user operation to confirm the selection. If "SPECIAL FEATURES" is selected in a display state shown in FIG. 5, a display state shown in FIG. 6 is set and "BD Live" can be selected. That is, there is a possibility of requiring Internet connection during the display of the pop-up menu.

Thus, if the pop-up menu is displayed (YES in Step S90), the LAN module 9 is activated again (Step S100). On the other hand, unless the pop-up menu is displayed (NO in Step S90), a return is made to Step S80 to maintain the temporary stop of the operation of the LAN module 9.

In Step S110 following Step S100, the control unit 6 determines whether or not the pop-up menu is no longer displayed.

If the user depresses the menu key of the remote controller transmitter during the display of the pop-up menu, the OSD image data used to display the pop-up menu is no longer output from the output unit 4 and the pop-up menu is no longer displayed.

If the pop-up menu is no longer displayed (YES in Step S110), the operation of the LAN module 9 is temporarily stopped in Step S120 and, thereafter, a return is made to Step S80 since there is no possibility of selecting "BD-Live" unless the pop-up menu is displayed again.

By the operation described above, the operation of the LAN module 9 is temporarily stopped for periods during which the BD is being reproduced and there is no possibility of selecting "BD-Live" (periods during which Internet connection is not necessary). In this way, power consumption and a utilization rate of the control unit 6 for controlling the LAN module 9 can be suppressed.

Although the embodiment relating to the present invention has been described above, the scope of the present invention is not limited to this and the present invention can be carried out while various changes are made without departing from the gist of the invention.

For example, although the auxiliary data downloaded by "BD-Live" are recorded in the nonvolatile memory 7 in the above embodiment, they may be recorded in an external memory connected to an external memory interface if the optical disc reproducing apparatus includes the external memory interface such as a USB (Universal Serial Bus) connector or an SD card slot.

Further, for example, in the above embodiment, the pop-up menu is kept displayed until it is instructed not to display the pop-up menu once the pop-up menu is displayed. However, upon the elapse of a predetermined time after the start of display of the pop-up menu, a transition may be forcibly made to Step S120 so that the pop-up menu is no longer displayed. Alternatively, upon the elapse of a predetermined time after the start of display of the pop-up menu, a switch may be forcibly made to screensaver display and the screensaver display may be maintained until a certain user operation is performed thereafter. Note that it is preferable to temporarily stop the operation of the LAN module 9 during the display of the screensaver since there is no possibility of selecting "BD-Live" and Internet connection is not necessary.

What is claimed is:

1. An optical disc reproducing apparatus, comprising:
an Internet connectable LAN module; and
a control unit for controlling the LAN module,
wherein the control unit includes
a first determiner for determining whether an optical disc loaded in the optical disc reproducing apparatus is an optical disc for which there is a possibility of Internet connection being required during reproduction and
a second determiner for determining whether an optical disc is being reproduced and in addition whether there is a possibility of execution of special reproduction being selected by user operation,
wherein the control unit,
when the first determiner yields an affirmative determination result and in addition the second determiner yields a negative determination result, temporarily stops operation of the LAN module to reduce power consumption by the LAN module and,
when the first determiner yields an affirmative determination result and in addition the second determiner yields an affirmative determination result, operates the LAN module and, when execution of special reproduction is selected by user operation, executes the special reproduction, and
wherein the special reproduction is a function of accessing a specified website on the Internet utilizing the LAN module, downloading auxiliary data corresponding to contents of the optical disc being reproduced via the Internet, recording the auxiliary data in a storage device other than the optical disc, and reproducing the contents of the optical disc while utilizing the downloaded auxiliary data.

2. The optical disc reproducing apparatus according to claim 1,
wherein the control unit,
when the first determiner yields a negative determination result and in addition the optical disc reproducing apparatus is reproducing or recording the optical disc, temporarily stops operation of the LAN module to reduce power consumption by the LAN module.

3. The optical disc reproducing apparatus according to claim 1, wherein
the second determiner determines a period from the start of playback of a main movie recorded on the optical disc being reproduced to the stop of playback of the main movie or to the start of display of a pop-up menu as a period in which there is no possibility of execution of special reproduction being selected by user operation;
and the pop-up menu includes a selection item of execution of the special reproduction.

4. The optical disc reproducing apparatus according to claim 3, wherein:

the second determiner determines a period from the end of display of the pop-up menu to the stop of playback of the main movie or the restart of display of the pop-up menu as a period in which there is no possibility of execution of special reproduction being selected by user operation.

* * * * *